Sept. 20, 1971  J. D. LESLIE  3,606,446
DRAIN HOLE PLUG ASSEMBLY
Filed Oct. 27, 1969  2 Sheets-Sheet 1
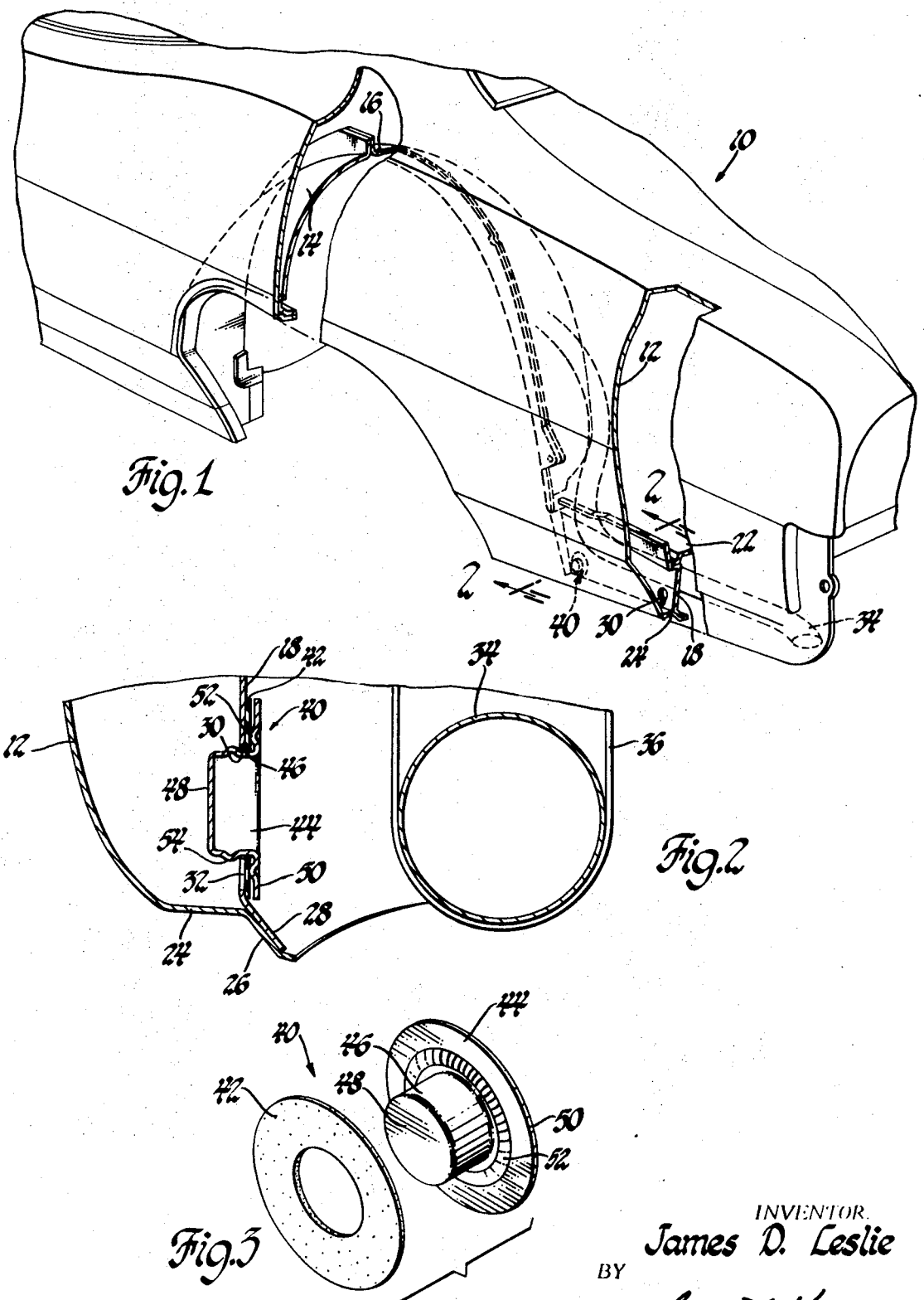
INVENTOR.
James D. Leslie
BY
Arthur N. Krein
ATTORNEY

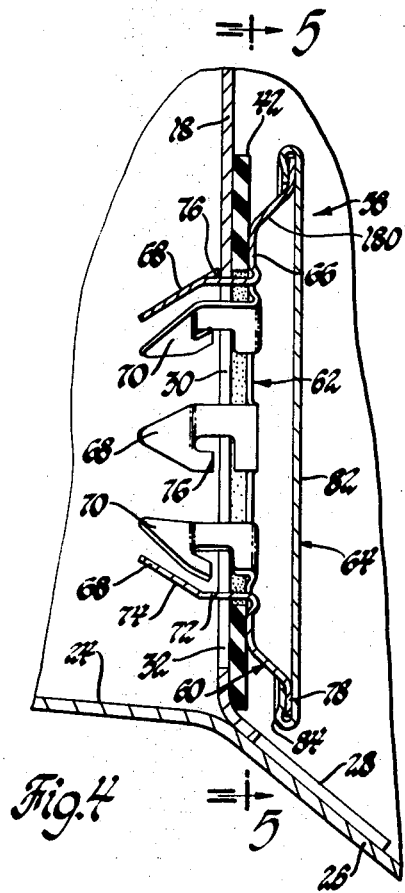
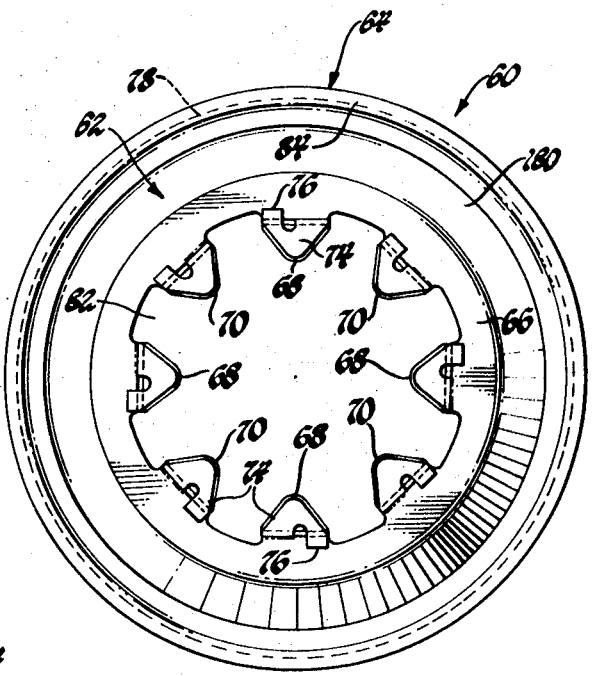
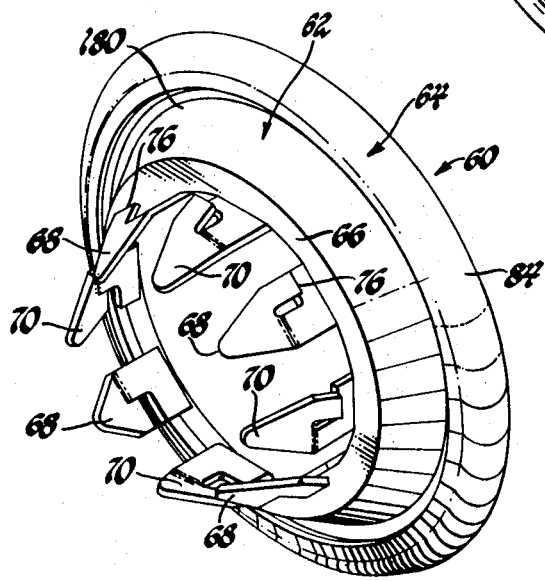

United States Patent Office 3,606,446
Patented Sept. 20, 1971

3,606,446
DRAIN HOLE PLUG ASSEMBLY
James D. Leslie, Birmingham, Mich., assignor to General
Motors Corporation, Detroit, Mich.
Filed Oct. 27, 1969, Ser. No. 869,793
Int. Cl. B62d 39/00
U.S. Cl. 296—28R                          7 Claims

ABSTRACT OF THE DISCLOSURE

A plug assembly to seal a drain hole opening in a vehicle body panel, the plug assembly including a retainer plug having a plug body portion which is inserted into the drain hole of a panel and secured therein, the retainer plug supporting a flexible washer serving as a flap valve which is retained against the outer face of the panel by an annular flange of the retainer plug, with the flexible washer being protected from heat by an annular flange on the plug retainer which extends outwardly and is spaced from the flexible washer.

---

This invention relates to a drain hole plug assembly and, more particularly, to a valve type drain plug for sealing drain holes located near the bottom of vehicle bodies.

Various parts of a vehicle body are former with spaced outer and inner panels seam-welded together with a generally horizontal portion adjacent their lower edge. Depending on the location of the vehicle body, openings are provided to the space between the panels, as for example, for the retraction of a window or to provide accessibility to mechanisms housed between the panels. Since water can enter through these openings, one or more drain holes are provided in the lower portions of the panel to permit the escape of water. Also, during the construction of the vehicle body, these drain holes are used as a drain for material, such as paint, during the assembly of the vehicle. To prevent dust or fumes from entering the interior of the vehicle through these drain openings while still permitting the escape or water, various sealing means have been proposed to close these drain openings, as for example, by a flap valve made of rubber or other suitable material, which is cemented or otherwise secured to the outer face of the panel adjacent to the drain opening. Such sealing means have proved to be disadvantageous when installed in relative close proximity to an exhaust pipe, since the heat from the exhaust pipe adversely affects the material of the flap valve and, therefore, its function in the sealing of the opening from outside dust and fumes and permitting the drainage of water from the space between the panels.

It is, therefore, an object of this invention to improve a plug assembly for a drain hole in which the retainer plug is provided with a heat shield to protect the flap valve elements of the plug assembly.

Another object of this invention is to improve a plug assembly for a drain hole whereby the plug assembly can be easily installed, but which cannot be easily removed.

These and other objects of the invention are obtained by means of a retainer and flap valve assembly in which the retainer has a body portion insertable into the drain hole opening of a panel and which is provided with means to securely fasten it to the panel, the flap valve encircling this body portion being positioned against the outer surface of the panel and held thereagainst by a flange of the retainer and protected from radiated heat by a heat shield in the form of an annular flange which extends outwardly and is spaced from the flap valve.

For a better understanding of the invention, as well as other objects and further features thereof, reference is had to the following detailed description of the invention to be read in connection with the accompanying drawings, wherein:

FIG. 1 is a perspective view of a portion of a vehicle body, with parts broken away, having the improved drain hole plug assembly of the invention;

FIG. 2 is a sectional view taken along line 2—2 of FIG. 1 showing the plug assembly of the invention in the installed position;

FIG. 3 is a perspective view of the elements of the drain hole plug assembly of FIG. 2 prior to assembly;

FIG. 4 is a sectional view similar to FIG. 2 but illustrating an alternate embodiment of a drain hole plug assembly installed in the drain opening of a vehicle body panel;

FIG. 5 is a view taken along line 5—5 of FIG. 4; and,

FIG. 6 is a perspective view of the retainer of the plug assembly of FIG. 4.

Referring now to FIG. 1, the rear body portion of a vehicle body 10, shown for illustrative purposes only, includes an outer rear quarter panel 12, outer and inner wheel housing panels 14 and 16, respectively, inner filler panel 18 and a rear compartment pan panel 22 suitably welded together along their edge flange portions resulting in the creation of interior spaces between quarter panel 12 and the remaining panels. As shown in FIGS. 1 and 2, the rear quarter panel 12 has a lower inwardly extending flange portion 24 terminating in depending flange 26. The vertically extending inner filler panel 18 has its lower flange portion 28 welded to flange 26 to form with the quarter panel a troughlike structure. Drain holes 30 with weeper slots 32 at the bottom thereof are provided in inner filler panel 18 which, after the assembly of the various components of the vehicle body, are sealed by plug assemblies 40, constructed in accordance with the invention, only one being shown in FIG. 1. In this location on the vehicle body, the plug assemblies are in close proximity to the vehicle exhaust pipe 34 suitably supported as by bracket 36 to the vehicle body.

Each plug assembly 40 includes a flap valve in the form of an annular washer 42, made of silicon rubber or other suitable flexible material, and a retainer plug 44. In the embodiment illustrated in FIGS. 2 and 3, the retainer plug 44, similar in construction and installation to the metal rivet disclosed in U.S. Pat. 2,306,460 issued on Dec. 29, 1942, to Engelbert A. Meyer and Hugh J. Bowdoin, is cup-shaped and made of a relatively soft and expandible or distortable metal. The retainer plug includes a tubular shank portion 46 closed at one end by inner wall 48 and has at its opposite end a radially extending flange 50 which, intermediate its ends, has an annular emboss forming an annular flange or washer retainer ring 52. This annular flange or washer retainer ring 52 is of a diameter to engage the washer 42 as shown in FIG. 2, slightly radially outward of the central opening therein to permit axial displacement of the outer portion of the washer adjacent to the weeper slot 32 to permit the egress of water through the weeper slot. The portion of flange 50 outward of washer retainer ring 52 is thus spaced from the washer and serves as the heat shield for the washer 42.

As shown in FIG. 3, the tubular shank portion 46 of the retainer plug, prior to assembly, is straight and has an outer diameter such that this portion of the retainer plug has a slight frictional fit inside the drain hole opening in the panel 18 so that it can be readily retained in place although it may be easily inserted into the drain opening. In the installation of this plug assembly, the washer 42 is slipped onto the tubular shank portion 46 and then the retainer plug is inserted into the drain opening until the washer 42 is against the outer surface of the filler panel 18. A suitable tool, not shown, reference being made to the aforementioned U.S. Pat. 2,306,460, is placed inside of the tubular shank portion 46 and, while pressing the tool against the end wall 48 to slightly compress the washer against the outer face of filler panel 18, the tool is operated to cause two or more portions of the tubular shank portion to be deformed to the position shown in FIG. 2 to provide shoulders 54 which engage the opposite surfaces of the filler panel from washer 42 to effectively retain the plug assembly in position within the drain opening.

In the embodiment of the plug assembly, generally designated 58, illustrated in FIGS. 4, 5 and 6, wherein like numerals indicate like parts, the retainer plug assembly includes a retainer plug 60 and a flap valve or washer 42. The retainer plug 60, which can be made in one piece or, as shown, in two parts suitably secured together, includes a tooth washer-like retainer 62 and cap 64. Retainer 62 made of resilient material, such as spring steel, includes a flat annular flange or base element 66 having a plurality of yieldable prongs 68 and 70 extending from the edge of the central opening therein which serve to secure the retainer in place on the filler panel 18. Each prong includes an axial extending portion 72 and a radially inward extending portion 74, the latter being formed by shearing portions of the axial extending portions and then bending the material so that each portion 74 has a panel engaging tab 76 at one end thereof. However, the axial position of the cut in the prongs are alternately staggered so that the tabs 76 on prongs 70 are positioned further from the plane of the annular flange or base element 66 than the tabs 76 on prongs 68. The axial extending portion of the prongs form in effect a segmented tubular body portion of the retainer with an outside diameter which is slightly less than the inside diameter of the drain opening 30 while the normal outside diameter described by the ends of the tabs 76 is greater than the inside diameter of the drain opening. An annular extending flange 78 is spaced from but integrally connected to base element 66 by ring 180.

In the construction illustrated, cap 64 includes disc cover 82 and a return bent flange 84, this flange being rolled over and folded radially inward over the flange 78 in tight overlapping relation whereby the disc 82 is firmly seated against the outer surface of flange 78. In this arrangement, the flange 78 and caps 64 serve as the protective flange or heat shield for washer 42.

In the installation of this plug assembly, the washer 42 is slipped over the prongs 68 and 70 to encircle the axial extending portions 74 and then the retainer is inserted into the drain opening. As the retainer is installed, the prongs 68 and 70 are forced into and through the drain hole opening, the prongs being resiliently bent radially inward until the tabs pass through the opening after which the prongs spring back to their normal position to permit the tabs of one of the sets of prongs to engage the inside surface of filler panel 18.

Using two sets of prongs with different axial spacing of the tabs 76 thereon, together with the compressibility of washer 42, permits the plug assembly to be securely fastened to the filler panel despite any normal variations in the thickness of the panel, whereby the washer 42 is sandwiched between the outer face of filler panel 18 and annular flange or base element 66.

The plug assemblies are constructed in accordance with the invention to maintain the drain hole closed against the entry of dust or fumes into the interior spaces of the vehicle body from the exterior thereof, but the flap valve or washer of the assembly can open outwardly, adjacent to the weeper slot in response to pressure thereagainst exerted by water accumulated in the interior spaces between the body panels. The functional ability of the flap valve or washer will not be affected over a period of time since the flap valve or washer is protected from heat by the spaced flange of the retainer plug. In order to adequately protect the flap valve from heat radiated from the exhaust pipe, the outside diameter of the flanges 50 and 78 should be equal to or greater than the outside diameter of the washer 42 to provide an effective heat shield for the washer.

What is claimed is:

1. A plug assembly for a drain hole with weeper slot in a vehicle body panel comprising, a retainer plug having tubular body means adapted to be inserted into the drain hole and secured to the panel, a first flange means disposed radially outward from said body means, a second flange means disposed radially outward from said body means and, a flap valve of flexible material encircling said body means, said flap valve being positioned to seat against the panel and to be held radially inward of its outer edges by said first flange means against the panel in position to normally close off the weeper slot, said second flange means being positioned in spaced axial relation to said flap valve with said first flange means positioned therebetween.

2. A plug assembly according to claim 1 wherein said retainer plug consists of a cup-shaped metal rivet having a tubular body portion closed at one end by an end wall and at its other end having an outward extending flange with an emboss intermediate its ends forming said second flange and said first flange, respectively, said tubular body portion being adapted to be expanded permanently outward to secure said retainer plug in place on the body panel.

3. A plug assembly according to claim 1 wherein said retainer plug consists of said first flange in the shape of an annular base flange with a central opening therein, said annular base flange having integral therewith a series of prongs extending substantially axially with respect to said central opening to provide said tubular body means, with the distal ends of said prongs inclined toward the central axis of said base flange to provide radially outwardly extendng circumferential panel engaging tabs, a second flange means and, means connecting said second flange means in spaced relation to said first flange means, said second flange means including means to provide a closed end wall for said retainer plug.

4. A plug assembly according to claim 3 wherein said distal ends of said prongs provide a first set of panel engaging tabs and a second set of panel engaging tabs, said first set of panel engaging tabs being positioned a greater distance from said base flange than said second set of panel engagng tabs.

5. In a vehicle body having an outer panel and an inner panel joined together to provide a troughlike structure provided with a drain hole, including a weeper slot, in the inner panel, a plug assembly secured to said inner panel to seal said drain hole, said plug assembly including a retainer plug having a tubular body means inserted into said drain hole and secured to the inside surface of said inner panel, first flange means disposed radially outward from said body means, a flap valve of flexible material encircling said body means and positioned to said drain hole and retained against the outside surface of said inner panel by said first flange means with a portion of said flap valve adjacent to said weeper slot free to move relative to said inner panel and second flange means disposed radially outward from said body means in spaced axial relation from said flap valve and the outside surface of said inner panel to protect said flap valve.

6. In a vehicle body having an outer panel and an inner panel joined together to provide a troughlike structure provided with a drain hole, including a weeper slot, in the inner panel, a plug assembly secured to said inner panel to seal said drain hole said plug assembly including a retainer means consisting of a cup-shaped rivet of deformable material having a tubular body portion closed at one end by an end wall and at its other end having an outward extending flange with an emboss intermediate its ends, a flap valve of flexible material encircling said body portion, said tubular body portion being positioned in said drain hole and expanded permanently outward to engage the inside surface of said panel with said flap valve sandwiched between the outside surface of said inner panel and said emboss with a portion of said flap valve adjacent to said weeper slot free to move relative to said inner panel, the portion of said flange outward of said emboss being in spaced heat protective relation to said flap valve.

7. In a vehicle body having an outer panel and an inner panel joined together to provide a troughlike structure provided with a drain hole, including a weeper slot, in the inner panel, a plug assembly secured to said inner panel to seal said drain hole, said plug assembly including retainer means consisting of an annular flange with a plurality of axially extending yieldable panel engaging prong means thereon, flange means, and means connecting said flange means in spaced relation to said annular flange, a flap valve of flexible material encircling said prong means, said retainer means being positoned in said drain hole with said prong means extending through said drain hole and engaging the inside surface of said inner panel thereby sandwiching said flap valve between the outside surface of said inner panel and said annular flange with a portion of said flap valve adjacent to said weeper free to move relative to said inner panel.

References Cited
UNITED STATES PATENTS

| | | | |
|---|---|---|---|
| 1,435,899 | 11/1922 | Logan | 137—525.3 |
| 3,158,176 | 11/1964 | Toland | 49—476X |
| 3,382,889 | 5/1968 | Heinz et al. | 49—476X |

LEO FRIAGLIA, Primary Examiner

J. A. PEKAR, Assistant Examiner

U.S. Cl. X.R.

49—476; 137—525; 280—152